Oct. 9, 1928.

J. KUTARNA 1,687,218

TANDEM BICYCLE

Filed July 27, 1927

INVENTOR
Jacob Kutarna
BY
ATTORNEY

Patented Oct. 9, 1928.

1,687,218

UNITED STATES PATENT OFFICE.

JAKOB KUTARNA, OF REGINA, SASKATCHEWAN, CANADA.

TANDEM BICYCLE.

Application filed July 27, 1927. Serial No. 208,704.

This invention relates to a new and useful improvement in tandem bicycles used as a means of transportation.

The object of the invention is to provide a tandem bicycle of novel construction and arrangement of parts, hereinafter more fully described, claimed and illustrated in the accompanying drawing, in which:

Figure 1:
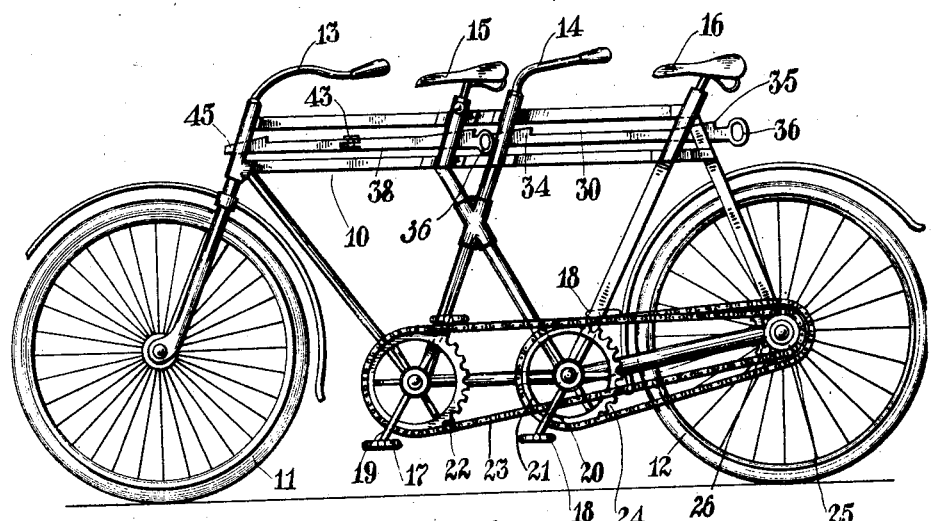
Fig. 1 is a side elevational view of my improved tandem bicycle.
Figure 2:
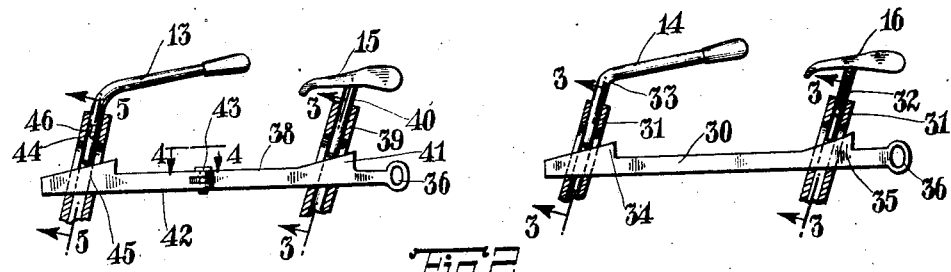
Fig. 2 is an enlarged fragmentary partly sectional view thereof.
Figure 3:
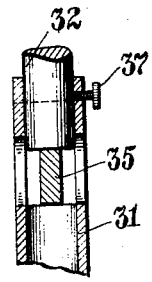
Fig. 3 is a vertical sectional view taken on the line 3—3 of Fig. 2.
Figure 4:
Fig. 4 is a fragmentary horizontal view looking in the direction of the line 4—4 of Fig. 2.
Figure 5:
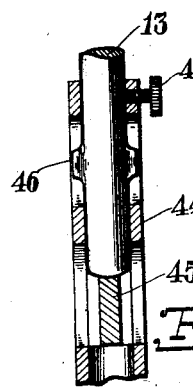
Fig. 5 is a vertical sectional view taken on the line 5—5 of Fig. 2.

The frame 10, the front wheel 11, the rear wheel 12, the front handle bars 13, the rear handle bars 14, the front seat 15, the rear seat 16, the pedals 17 and 18, the crank hangers 19 and 20, the sprocket wheels 21 and 22, the sprocket chains 23 and 24, and the sprocket wheels 25 and 26 are of common construction, such as generally embodied in tandem bicycles.

As here embodied my improved tandem bicycle comprises a slidable member 30, mounted in elongated apertures formed in tubular elements 31 of the frame 10, the elements 31 being adapted to slidably accommodate the rear seat post 32 and the rear handle-bars 33. The slidable member 30 is provided with tapered portions 34 and 35 engaging the lower extremities of the rear seat post 32, and the rear handle bars 33, respectively. The slidable member 30 is provided with an extended element having a handle portion 36. The above described construction is such as will permit the said rear seat 16 attached in the usual manner to the rear seat post 32, and the said rear handle bars 14, to be raised or lowered from the frame 10 in the same relative amount as may be desired to accommodate the rider. The threaded members 37 are threadedly engaged in to the tubular elements 31 of the frame 10, and are adapted to abut the rear handle bars 33 and the rear seat post 32, as a means of holding the rear handle bars 33 and the rear seat 16 in the said desired position.

A slidable member 38 is mounted in an elongated aperture formed in the tubular element 39 of the frame 10, said elements 39 being adapted to slidably accommodate the front seat post 40. The slidable member 38 is provided with a tapered portion 41 engaging the lower extremity of the front seat post 40. A supplementary slidable member 42 is pivotally attached as at 43, by a pin, or the like to the slidable member 38, the supplementary slidable member 42 being mounted in an elongated aperture formed in the tubular element 44 of the frame 10, elements 44 being adapted to slidably accommodate the front handle bars 13. The supplementary slidable member 42 is provided with a tapered portion 45, engaging the lower extremity of the front handle bars 13. The front handle bars 13 are provided with extended elements 46, slidably engaged in elongated apertures formed in the tubular element 44. The above described construction is such as will permit the front handle bars 13 and the front seat 15 to be raised or lowered as may be desired to accommodate the rider, and which will permit the handle bars 13 to be pivoted so as to steer my improved tandem bicycle.

It should be understood that a threaded member 47 is threadedly engaged in the tubular element 44 as a means of holding the front handle bars 13 in the said desired position.

The bicycle may also be driven by motors which may be suitably secured to the frame.

Having thus described my invention, what I claim as new and desire to protect by Letters Patent of the United States is as follows:

1. In a tandem bicycle, a slidable member provided with tapered portions adapted to engage the rear seat post and the rear handle bars of a tandem bicycle, as a means of raising and lowering the said rear handle bars and a rear seat attached to the said rear seat post.

2. In a tandem bicycle of the class described, a slidable member provided with a tapered portion adapted to engage the front seat post of the said tandem bicycle, a supplementary slidable member pivotally attached to the said slidable member, said supplementary slidable member provided with a tapered portion adapted to engage a front handle bar of the said tandem bicycle, as a means of raising and lowering a front seat attached to the said front seat post, and the seat front handle bars, so as to permit the said front handle bars to steer the said tandem bicycle.

3. In a tandem bicycle, a slidable member provided with tapered portions adapted to engage the rear seat post and the rear handle bars of a tandem bicycle, as a means of raising and lowering the said rear handle bars and a rear seat attached to the said rear seat post, a second slidable member provided with a tapered portion adapted to engage the front seat post of the said tandem bicycle, a second supplementary slidable member pivotally attached to the said second slidable member, said second supplementary slidable member provided with a tapered portion adapted to engage a front handle bar of the said tandem bicycle, as a means of raising and lowering a front seat attached to the said front seat post, and the seat front handle bars, so as to permit the said front handle bars to steer the said tandem bicycle.

In testimony whereof I have affixed my signature.

JAKOB KUTARNA.